Jan. 31, 1950 L. R. BROTHERS 2,496,035

PHONOGRAPH PICKUP ARM

Filed April 9, 1947

Inventor

Lewis R. Brothers

By L. B. James

Attorney

Patented Jan. 31, 1950

2,496,035

UNITED STATES PATENT OFFICE 2,496,035

PHONOGRAPH PICKUP ARM

Lewis R. Brothers, North Hollywood, Calif.

Application April 9, 1947, Serial No. 740,369

1 Claim. (Cl. 179—100.41)

This invention relates to phonographs and more particularly the pick-up arms thereof.

The primary object of this invention resides in the provision of a pick-up arm for phonographs adapted to materially reduce scratch noises picked up by the stylus needle from records.

Another object of this invention resides in the particular construction of the pick-up arm per se.

A further object of this invention resides in the particular disposition of the stylus needle socket and crystal cartridge on the pick-up arm.

A still further object of this invention resides in the particular manner of connecting the stylus needle socket to the crystal cartridge.

Aside from the aforesaid objects, this invention resides in so constructing the pick-up arm that it lies in a common vertical position at all times with the pistol point thereof disposed approximately 77 degrees to the rear of the point of the stylus needle.

Among the many objects of this invention is that of disposing the crystal cartridge on the arm at a point remote from the stylus needle so the free or stylus needle supporting end thereof is reduced in size for not only cutting records but to permit clear vision of the needle when placing it on a record.

With these and other objects in view, this invention resides in certain novel features of construction and arrangement of elements to be hereinafter more particularly set forth in the specification, illustrated in the accompanying drawing and pointed out in the appended claim and, although this disclosure depicts my present conception of the invention, the right is reserved to resort to such departures therefrom as come within the spirit of the invention.

In the accompanying drawing forming a part of this application:

Figures 1, 2:
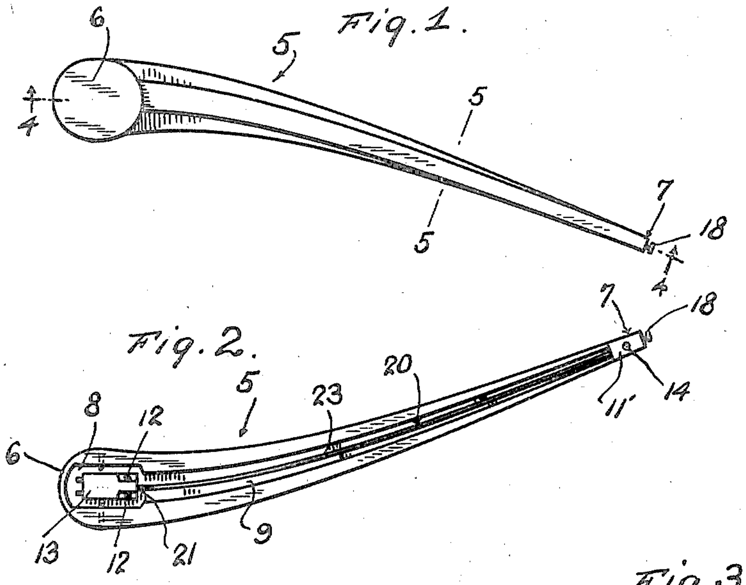
Fig. 1 is a plan view of the pick-up arm.
Fig. 2 is a bottom view of the pick-up arm.
Figure 3:
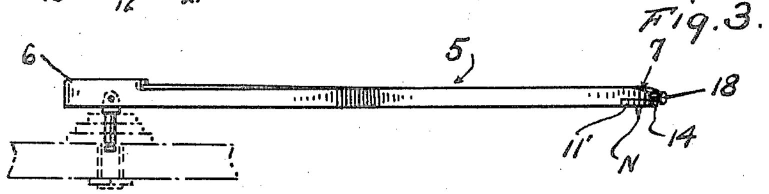
Fig. 3 is a side view thereof.
Figure 4:
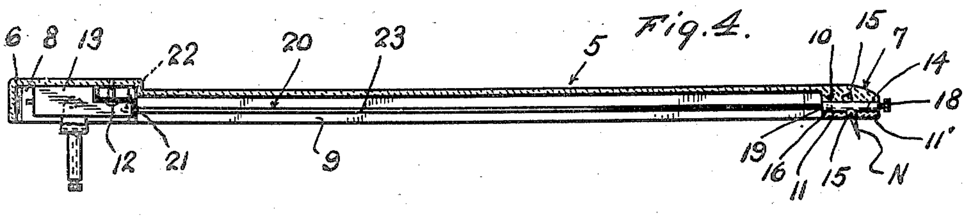
Fig. 4 is a longitudinal sectional view through the pick-up arm taken approximately on line 4—4 of Fig. 1.
Figure 5:
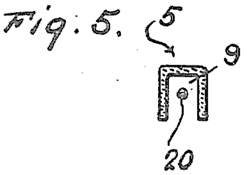
Fig. 5 is a cross sectional view taken approximately on line 5—5 of Fig. 1.
Figure 6:
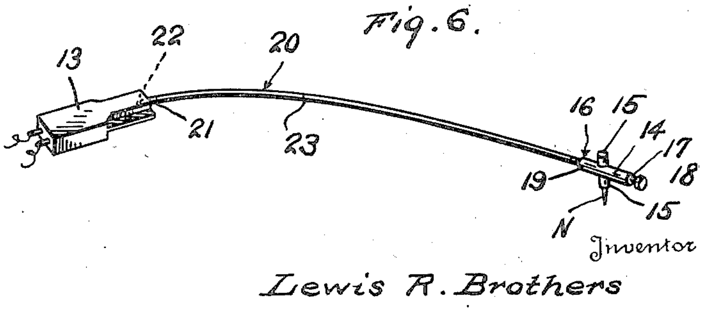
Fig. 6 is a perspective view of the stylus rod, crystal cartridge and needle socket in assembled disposition.

In the present illustration of this invention the numeral 5 designates, in general, a pick-up arm for phonographs and although it is preferably made of plastic material, any suitable material may be substituted therefor.

The aforesaid pick-up arm is disposed on an arc having a vertical axis and is tapered from its substantially circular inner end or head 6 to its outer or stylus supporting end 7 to reduce the size thereof for contact with phonograph records especially when used for cutting the same.

Preferably formed in the lower side of the head of the arm 5 is a pocket 8 communicating with an elongated groove 9 which, in turn, communicates with aligned slots 10 in the outer reduced end 7 of the arm. Said slot 10 communicates with a stylus needle receiving aperture 11 extending inwardly from the bottom of a filler block 11′ secured over the slot 10, however, it is within the purview of this invention to otherwise dispose the pocket, channel, slot and aforesaid aperture in the arm just so their functions can be practiced.

Secured in the aforesaid pocket 8 by screws 12 or the like is a crystal cartridge 13 while rigidly disposed in the slot 10 is a substantially cross shape socket 14 having its arms 15 apertured and disposed in the aperture 11 for receiving a stylus needle N. The outer portion of the staff 16 is provided with a threaded aperture 17 for reception of a threaded thumb screw 18 adapted to retain the stylus needle therein. Said crystal cartridge and socket, although being attached to the arm as heretofore set forth, may be molded or otherwise secured thereto.

Suitably secured at its outer end 19 to the inner end of the aforesaid socket 14 is an elongated stylus rod 20 having its opposite or inner end 21 threadedly engaged in a threaded recess 22 in the crystal cartridge with its intermediate portion 23 suspended therebetween in the groove 9 of the arm.

With this invention fully set forth, it is manifest that means are provided whereby sound noises created between the stylus needle and records is eliminated and, through the particular assemblage of elements involved, the cost of manufacture thereof is nominal.

Having thus described my invention, what I claim and desire to protect by Letters Patent is:

The combination with an arcuate pick-up arm for phonographs having a substantially cross-shaped pocket in its outer end communicating with an elongated substantially rectangular pocket in its inner end by an arcuate groove formed in the lower side thereof, a substantially cross-shaped stylus needle socket including a horizontal arm and forwardly extending staff, said horizontal arm having a threaded bore therein intersecting a smooth bore in said staff, a needle removably disposed in the smooth bore of the staff of the cross-shaped stylus needle socket, a thumb-screw threadedly disposed in the threaded bore of said horizontal arm and rigidly securing the needle to the staff of the cross-shaped stylus needle socket, a crystal secured in the aforesaid enlarged pocket at the inner end of the pick-up arm, an arcuate stylus rod connecting the crystal and the substantially cross-shaped stylus needle socket with its intermediate portion suspended in the arcuate groove of the pick-up arm, and a filler block secured over the substantially cross-shaped socket in the outer end of the pick-up arm and retaining the substantially cross-shaped stylus needle socket rigidly therein.

LEWIS R. BROTHERS.

REFERENCES CITED

The following references are of record in the file of this patent:

UNITED STATES PATENTS

| Number | Name | Date |
|---|---|---|
| 1,472,214 | Gonce | Oct. 30, 1923 |
| 1,763,891 | Jones | June 17, 1930 |
| 1,776,045 | Rogers | Sept. 16, 1930 |
| 1,843,845 | Stunz | Feb. 2, 1932 |
| 2,320,427 | Guedon | June 1, 1943 |
| 2,363,497 | Begun | Nov. 28, 1944 |
| 2,381,861 | Bauer | Aug. 14, 1945 |